United States Patent [19]

Maeda et al.

[11] 4,354,693
[45] Oct. 19, 1982

[54] VEHICLE HEIGHT ADJUSTING DEVICE

[75] Inventors: Koichi Maeda, Kawasaki; Sumio Ema, Yokohama; Tetsuo Saito, Zama, all of Japan

[73] Assignee: Tokico Ltd., Kanagawa, Japan

[21] Appl. No.: 176,242

[22] Filed: Aug. 7, 1980

[30] Foreign Application Priority Data

Aug. 20, 1979 [JP] Japan .............. 54-114328[U]

[51] Int. Cl.³ .............................. B60G 11/26
[52] U.S. Cl. .................. 280/714; 267/64.21; 280/DIG. 1
[58] Field of Search .......... 280/714, 707, DIG. 1, 280/6 R, 6 H, 6.1; 267/65 D

[56] References Cited

U.S. PATENT DOCUMENTS

| | | | |
|---|---|---|---|
| 3,339,910 | 9/1967 | Jackson | 280/124 F |
| 3,603,611 | 9/1971 | Wenham | 280/124 F |
| 3,633,935 | 1/1972 | Boyer | 280/124 F |
| 3,747,949 | 7/1973 | Engfer | 280/707 |
| 4,105,216 | 8/1978 | Graham et al. | 280/707 |
| 4,168,840 | 9/1979 | Graham | 280/707 |

*Primary Examiner*—Joseph F. Peters, Jr.
*Assistant Examiner*—Ross Weaver
*Attorney, Agent, or Firm*—Wenderoth, Lind & Ponack

[57] ABSTRACT

A vehicle height adjusting device includes an air compressor, an air tank storing pressurized air produced in the air compressor, a dehumidifying device provided between the air compressor and the air tank, and an elevating device for elevating or descending the height of a vehicle and receiving pressurized air from the air tank or from the air compressor in elevating the height of the vehicle and exhausting pressurized air therefrom through the dehumidifying device to atmosphere in descending the height of the vehicle. There are provided a pressure detector detecting the pressure in the air tank, a height detector detecting the height of the vehicle, and a controlling circuit connected to the pressure detector and the height detector for controlling the operation of the elevating device in accordance with the output signal of the height detector and that of the air compressor in accordance with the output signals of the pressure detector and the height detector.

4 Claims, 3 Drawing Figures

VEHICLE HEIGHT ADJUSTING DEVICE

BACKGROUND OF THE INVENTION

This invention relates to vehicle height adjusting devices of the kind including a source of pressurized air and an elevating device receiving pressurized air from the source in elevating the height of a vehicle and exhausting pressurized air therefrom in descending the height of the vehicle.

Conventionally, the source of pressurized air comprises an air compressor and an air tank storing pressurized air supplied from the air compressor. The air compressor is operated when the pressure in the air tank decreases below a predetermined level, and the operation of the air compressor is terminated when a pressure in the air tank exceeds a second predetermined level which is higher than the first mentioned level. The operation of the air compressor has been performed independently of the height of the vehicle. Further, a height detector is provided to control the supply or exhaust of pressurized air into or from the elevating device, and a dehumidifying device is provided between the air compressor and the air tank to remove water from the pressurized air produced in the air compressor, and for regenerating or reactivating the dehumidifying device the pressurized air exhausted from the elevated device is passed through the dehumidifying device in the direction opposite to that of the pressurized air produced in the air compressor. Thus, there is a problem such that when the pressure in the air tank is lower than a predetermined level and the height of the vehicle is higher than a predetermined level, the pressurized air produced in the air compressor tends to flow through the dehumidifying device in one direction and pressurized air exhausted from the elevating device tends to flow through the dehumidifying device in the opposite direction. The operation of the air compressor is not satisfactorily performed and, also, the pressurized gas in the elevating device is not satisfactorily exhausted. As a result, the supplying and exhausting operations are excessively prolonged and, finally, either one operation is terminated satisfying the object thereof and, thereafter, the other operation is terminated. Therefore, the height of the vehicle cannot smoothly be adjusted and, there are considerable amounts of losses of the energy and of the movement of related members. Further, the device may become out of order.

Such phenomenon will be observed in conventional vehicle height adjusting devices when passengers get out of the vehicle or a cargo is discharged in operating the air compressor.

SUMMARY OF THE INVENTION

One object of the present invention is to solve the problem aforementioned and, according to the invention, there is provided a vehicle height adjusting device comprising an air compressor, an elevating device provided between a chassis and a wheel shaft of a vehicle and receiving pressurized air from the air compressor for increasing the height of the vehicle, a height detector for detecting the height of the vehicle, an exhaust valve for exhausting pressurized air from the elevating device in decreasing the height of the vehicle, a piping provided between the elevating device and the air compressor and the exhaust valve through which the pressurized air produced in the air compressor flows in one direction and the pressurized gas exhausted from the elevating device flows in the other direction, and a control circuit receiving the output signal from the height detector and controlling the operation of the air compressor to control the flow in the piping.

Preferably, a dehumidifying device is provided in the piping and a pressure detector is provided to control the operation of the air compressor and, the output signal of the pressure detector is modified in the control circuit when the exhaust valve is opened by the output signal of the height detector.

BRIEF DESCRIPTION OF THE DRAWINGS

The invention will hereinafter be explained in detail with reference to the attached drawings exemplifying a preferred embodiment of the invention, in which.

DETAILED DESCRIPTION OF THE PREFERRED EMBODIMENT

Figure 1:
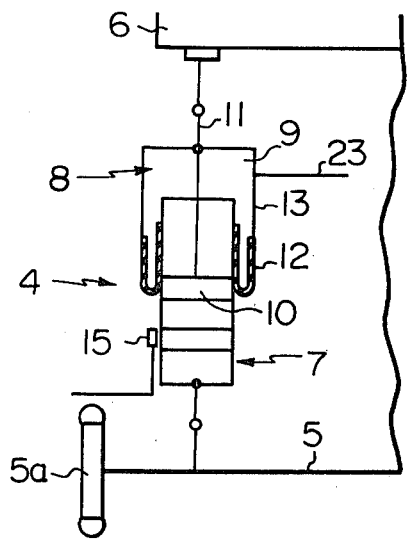
FIG. 1 is a schematic view of an elevating device used in a vehicle height adjusting device according to the invention.

The elevating device 4 shown in FIG. 4 is provided between a wheel shaft 5 supporting a wheel 5a of a vehicle and a chassis 6, and comprises a hydropneumatic damper 7 and an air spring unit 8. The air spring unit 8 comprises a cylindrical member 13 secured to a piston rod 11 of the damper 7 to encircle the upper portion of the damper 7, and a cylindrical flexible member 12 connected to the damper 7 and to the cylindrical member 13 so as to define an air chamber 9 between the cylindrical member 13 and the damper 7. The piston rod 11 is secured to a piston 10 of the damper 7 and is connected to the chasis 6. An air pipe 23 is connected to the cylindrical member 13 to supply pressurized air into the air chamber 9 in elevating the height of the vehicle and to exhaust pressurized air from the air chamber 9 in decreasing the height of the vehicle. A height detector 15 is provided on the damper 7 to detect the position of the piston 10 thereby detecting the vertical positional relationship of the chasis 6 with respect to the wheel shaft 5. Alternatively, the height detector 15 may be mounted on the chassis 6 to detect the position of the damper 7. The height detector 15 detects the height of the vehicle and generates output signals classifying the height into a high vehicle height condition which is higher than a desired range of the vehicle height (a high height signal), a medium height condition (a medium height signal) and a low vehicle height condition which is lower than the desired range of the vehicle height (a low height signal).

Figure 2:
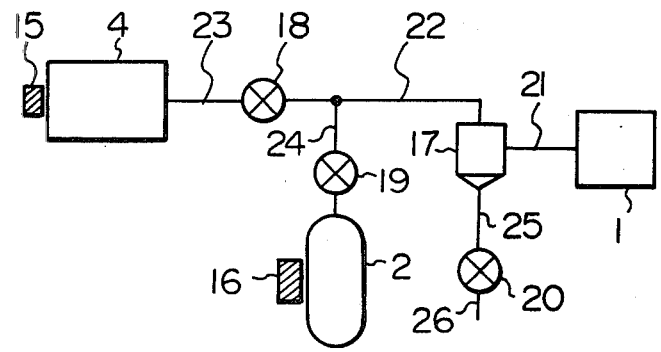
FIG. 2 is a schematic view of the vehicle height adjusting device.

Referring particularly to FIG. 2, the vehicle height adjusting device according to the invention comprises an air compressor 1 acting as a source of pressurized air, an air tank 2 storing the pressurized air produced in the air compressor, the elevating device 4, and a dehumidifying device 17 for removing water from the pressurized air produced in the air compressor 1. A pressure detector 16 detects the pressure in the air tank 2 and generates output signals when the pressure in the air tank 2 exceeds a predetermined level (a high pressure signal) or when the pressure is below a predetermined level which is lower than the first mentioned level (a low pressure signal).

The dehumidifying device 17 for removing water from the pressurized air produced in the air compressor 1 preferably comprises a filter element of water attractive material such as glass wool. The glass wool can effectively attract water droplets contained in the air stream, and the attracted water can be released therefrom in reversing the direction of the air flow passing through the dehumidifying device, whereby the water attractive power of the filter element can be reactivated.

Valves 18, 19 and 20 and pipings 21, 22, 23, 24, 25 and 26 connect the air compressor 1, the dehumidifying device 17, the air tank 2 and the elevating device 4 as shown in FIG. 2. More particularly, pressurized air produced in the air compressor 1 is directed through the piping 21 to the dehumidifying device 17 and is supplied to the air tank 2 through pipings 22 and 24 and the valve 19 or directly to the elevating device 4 through pipings 22 and 23 and the valve 18. The dehumidifying device 17 is connected with atmosphere through pipings 25 and 26 and the valve 20 which acts as an exhaust valve which exhausts pressurized air from the elevating device 4 in lowering the height of the vehicle and, also, exhausts drain water which may accumulate in the dehumidifying device and reactivates the filter element in the dehumidifying device.

Figure 3:
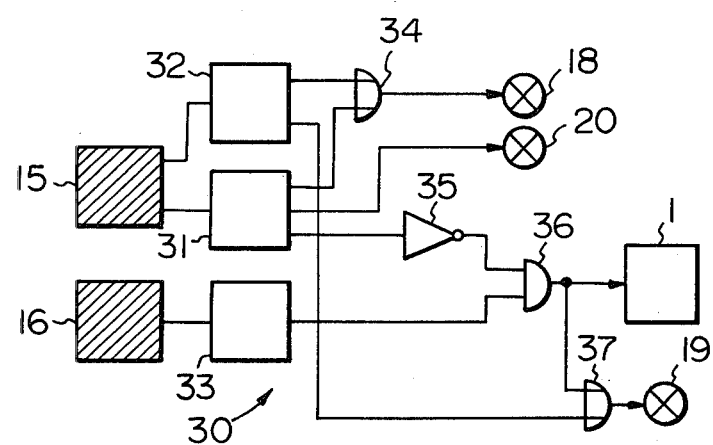
FIG. 3 is a schematic diagram of an electric control circuit of the vehicle height adjusting device of FIG. 2.

Now description will be made with reference to an electric control system 30 of FIG. 3.

The output signal of the height detector 15 is supplied to a first height signal converting circuit 31 which generates an output signal of level "1" in response to the high height signal of the height detector 15 and an output signal of level "0" in response to the medium and low height signals of the height detector 15. The valve 20 is directly controlled by the output signal of the circuit 31 such that the valve 20 opens when the level is "1" and closes when the level is "0". The output signal of the circuit 31 is further supplied to a first OR circuit 34 as a first input thereof, and to an AND circuit 36 as a first input thereof through a NOT circuit 35 which will hereinafter be explained.

The output signal of the height detector 15 is also supplied to a second height signal converting circuit 32 which generates an output signal of level "1" in response to the low height signal of the height detector 15 and an output signal of level "0" in response to the medium height signal and the high height signal of the height detector 15. The output signal of the circuit 32 is supplied to the OR circuit 34 as a second input thereof and to a second OR circuit 37 as the first input thereof. The valve 18 is controlled by the OR circuit 34 such that the valve 18 opens in the high height condition and in the low height condition and closes in the medium height condition.

The pressure signal generated in the pressure detector 16 is supplied to a pressure signal converting circuit 33 which generates an output signal of level "1" in response to the low pressure signal of the pressure detector 16 and an output signal of level "0" in response to the high pressure signal of the detector 16. The output signal of the circuit 33 is supplied to the AND circuit 36 as a second input thereof. Thus, the output signal of the circuit 36 is "1" only when the pressure signal of the circuit 33 is "1" and the height signal of the circuit 31 is "0". The output signal of the circuit 36 is utilized to control the operation of the air compressor 1 such that the air compressor 1 operates when the output signal of the circuit 36 is "1". Namely, the air compressor 1 operates only when the pressure in the air tank 2 is at a low pressure and the height of the vehicle is not at the high level.

The output signal of the circuit 36 is also supplied to the OR circuit 37 as a second input thereof, and the valve 19 is controlled by the output signal of the circuit 37 such that the valve 19 opens when the pressure in the air tank 2 is low and the height of the vehicle is not high and when the pressure in the air tank 2 is high and the height of the vehicle is low.

The control circuit 30 described as above and elements constituting the circuit may be substituted by any suitable circuit or elements which are familiar to those skilled in the technical field of logic circuitry.

The operation of the height adjusting device shown in the drawings will now be explained.

When the height of the vehicle decreases and a low height signal is generated from the detector 15, an output signal of level "1" is generated from the circuit 32, whereby the output signal of level "1" is transmitted from the circuit 34 to the valve 18 to open the valve. The valve 20 is maintained in the closed condition since the circuit 31 generates the output signal of level "0". The output signal of the circuit 33 is of level "1", but when the output of the detector 16 is a high pressure signal, the output of the circuit 33 is of level "0" and the output of the circuit 36 is of level "0", thus, the air compressor 1 is not operated. The output signal of the circuit 32 makes the output of the circuit 37 into level "1" thereby opening the valve 19. The pressurized air stored in the tank 2 is supplied into the elevating device 4 through the valve 19, the piping 24, the valve 18 and the piping 23. The supplying condition is continued until the detector 15 detects the medium height condition, whereat the output of the circuits 31 and 32 are "0" level condition making the output of the circuit 34 into "0" to close the valve 18. During the supplying condition, the pressure in the tank 2 may decrease below the predetermined low pressure level, and then the output of the circuit 33 will become "1" changing the output signal of the circuit 36 into "1" to operate the air compressor 1 with the valves 18 and 19 being in the opened condition and the pressurized air produced in the air compressor 1 is supplied both into the air tank 2 and the elevating device 4. When the height of the vehicle increases to the medium height condition the valve 18 closes and the supply of the pressurized air is directed only to the air tank 2. And when the pressure in the tank 2 increases to the high pressure condition, the operation of the air compressor 1 is terminated.

When the height of the vehicle is increased by e.g. discharging a cargo, a high height signal is issued from the detector 15, whereby the output signal of level "1" is generated from the circuit 31 to open the valves 18 and 20. The pressurized air in the elevating device 4 is exhausted to atmosphere through the valves 18 and 20, the pipings 23, 22, 25 and 26, and the dehumidifying device 17. The exhausting is continued until the height of the vehicle decreases to the medium height condition and the valve 20 is closed by the circuit 31. When the output of the circuit 31 is "1", the output of the circuit 35 and, accordingly, of the circuit 36 are maintained "0", thus, the air compressor 1 is not operated. And, further, the output of the circuit 32 is also "0", thus, the output of the circuit 37 is "0" whereby the valve 19 is maintained at the closed condition. Therefore, the pressurized air exhausting operation is not performed simultaneously with the pressurized air supplying operation and, therefore, the operations can smoothly be performed and the height adjusting operation can smoothly and quickly be performed.

As described heretofore, the operation of the air compressor is controlled both by the pressure in the air tank and the height of the vehicle, according to the invention. Thus, the pressurized air supplying and exhausting operations can efficiently be performed and the vehicle height adjusting operation can reliably be performed.

In the embodiment, the described pressure detector 16 detects the pressure in the air tank 2, and the low pressure signal thereof is utilized to operate the air compressor when the height of the vehicle is in the medium or low height condition, and the operation of the air compressor is terminated when the pressure in the air tank exceeds the low pressure level. However, the pressure detector and the related control circuits may be modified such that the operation of the air compressor is maintained in the low pressure medium pressure range, when the height of the vehicle is in the low or medium levels, and the operation of the air compressor terminates when the pressure in the air tank increases to a high pressure range or when the height of the vehicle increases to the high height condition.

What is claimed is:

1. A vehicle height adjusting device comprising:
   air compressor means for generating compressed air;
   air tank storage means for receiving and storing pressurized air from said air compressor means;
   elevating means, adapted to be mounted between the chassis and a wheel shaft of the vehicle, for receiving a flow of pressurized air in a first direction from said air compressor means or pressurized air from said air tank storage means and thereby for increasing the height of the vehicle;
   exhaust valve means for exhausting air from said elevating means in a second direction reverse to said first direction and thereby for decreasing the height of the vehicle;
   dehumidifying means receiving said flow of pressurized air in said first direction for removing water therefrom, and receiving said air exhausted from said elevating means in said second direction;
   height detecting means for detecting the height of the vehicle and for generating signals representative thereof;
   pressure detector means for detecting the air pressure in said air tank storage means and for generating signals representative thereof; and
   electric control circuit means, operatively connected to said height detecting means, said air compressor means and said pressure detector means, for receiving said signals from said height detecting means and said pressure detector for controlling the operation of said air compressor means as a function thereof, including deactivating said air compressor means when said exhaust valve means is operable for exhausting air from said elevating means even when the air pressure in said air tank storage means is below a predetermined minimum which would otherwise activate said air compressor means.

2. A device as claimed in claim 1, further comprising first valve means for controlling the air supplied into or exhausted from said elevating means, and second valve means for controlling the air supplied into or removed from said air tank storage means, and wherein said electric control circuit means includes means for controlling the operation of said air compressor means, said exhaust valve means and said first and second valve means in response to said signals from said height detecting means and said pressure detector means.

3. A device as claimed in claim 2, wherein said electric control circuit means comprises means for operating said air compressor means only when said pressure detector means detects that said air pressure in said air tank storage means is below said predetermined minimum and when said height detecting means detects that the vehicle height is not above a predetermined maximum height, means for opening said exhaust valve means only when said height detecting means detects that the vehicle height is above said predetermined maximum height, means for opening said first valve means only when said height detecting means detects that the vehicle height is above said predetermined maximum height or below a predetermined minimum height, and means for opening said second valve means only when said pressure detector means detects that said air pressure in said air tank storage means is below said predetermined minimum and said height detecting means detects that the vehicle height is not above said predetermined maximum height, or when said pressure detector means detects that said air pressure in said air tank storage means is above a predetermined maximum and said height detecting means detects that the vehicle height is below said predetermined minimum height.

4. A device as claimed in claim 3, wherein said predetermined minimum air pressure is at a value lower than said predetermined maximum air pressure.

* * * * *